(12) United States Patent
Roger

(10) Patent No.: US 11,034,421 B2
(45) Date of Patent: Jun. 15, 2021

(54) COUPLING SYSTEM, ASSEMBLY OF AN EQUIPMENT RIGIDLY CONNECTED TO A USER AND A COUPLING SYSTEM AND KITEBOARDING KITE BAR

(71) Applicant: Donatien Roger, Rouen (FR)

(72) Inventor: Donatien Roger, Rouen (FR)

(*) Notice: Subject to any disclaimer, the term of this patent is extended or adjusted under 35 U.S.C. 154(b) by 239 days.

(21) Appl. No.: 16/329,484

(22) PCT Filed: Aug. 25, 2017

(86) PCT No.: PCT/FR2017/052281
§ 371 (c)(1),
(2) Date: Feb. 28, 2019

(87) PCT Pub. No.: WO2018/042113
PCT Pub. Date: Mar. 8, 2018

(65) Prior Publication Data
US 2019/0193820 A1   Jun. 27, 2019

(30) Foreign Application Priority Data
Aug. 31, 2016 (FR) ...................... 1658086

(51) Int. Cl.
*F16B 45/00* (2006.01)
*B63H 8/16* (2020.01)
*B64C 31/028* (2006.01)

(52) U.S. Cl.
CPC ............. *B63H 8/16* (2020.02); *F16B 45/00* (2013.01); *B64C 31/0285* (2013.01)

(58) Field of Classification Search
CPC .. B63H 8/16; B63H 8/18; F16B 45/00; B64C 31/0285
See application file for complete search history.

(56) References Cited

U.S. PATENT DOCUMENTS

| 7,036,771 B1 | 5/2006 | Pouchkarev |
| 2012/0049006 A1 | 3/2012 | Logosz et al. |
| 2015/0108279 A1 | 4/2015 | Enserink |

FOREIGN PATENT DOCUMENTS

| DE | 10 2009 029 987 A1 | 12/2010 |
| DE | 20 2011 050 424 U1 | 9/2011 |
| DE | 20 2011 050 423 U1 | 11/2011 |
| DE | 20 2012 003 062 U1 | 4/2012 |

(Continued)

OTHER PUBLICATIONS

International Search Report and Written Opinion dated Dec. 22, 2017, from corresponding PCT application No. PCT/FR2017/052281 (with Translation).

(Continued)

*Primary Examiner* — Alexander S Thomas
(74) *Attorney, Agent, or Firm* — Nixon & Vanderhye

(57) ABSTRACT

Disclosed is a coupling system for coupling a piece of equipment rigidly connected to a user with at least one rigging strand, including a central body made of two parts configured to be assembled with one another via an attachment unit, a fastener including two ends, a shell configured to at least partially cover the side surface of the central body, and at least one lock configured to engage with the shell in order to releasably lock the second end of the fastener, the shell being movable in translation over the side surface of the central body and being connected to the central body via at least one elastic recall component.

19 Claims, 4 Drawing Sheets

(56) References Cited

FOREIGN PATENT DOCUMENTS

WO    2013/166596 A1    11/2013

OTHER PUBLICATIONS

French Search Report and Written Opinion dated May 4, 2017, from corresponding FR application No. 1658086 (with Translation).
Airush, YouTube video entitled "02 2010 Brain Quick Release Maintenance", URL: <https://www.youtube.com/watch?v=TJEDL9PdXQl&t=140s>, Published on Sep. 2, 2009.

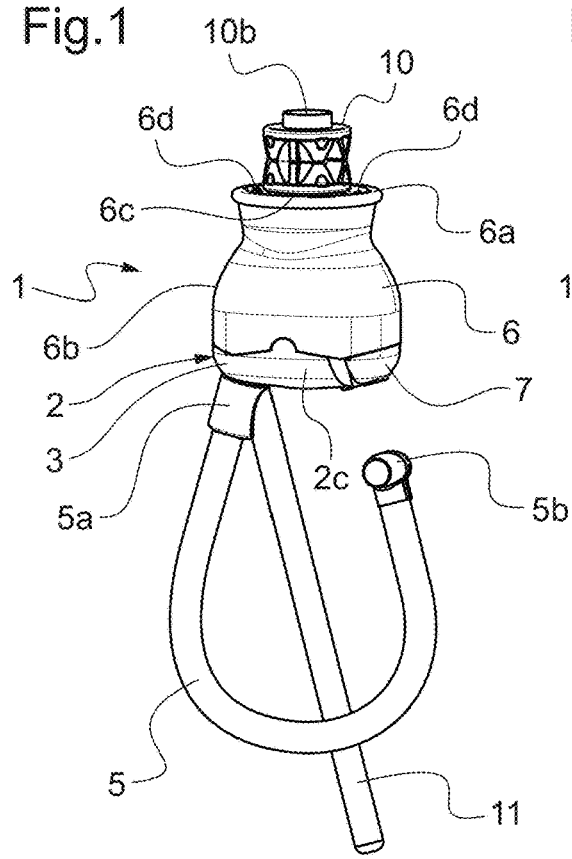
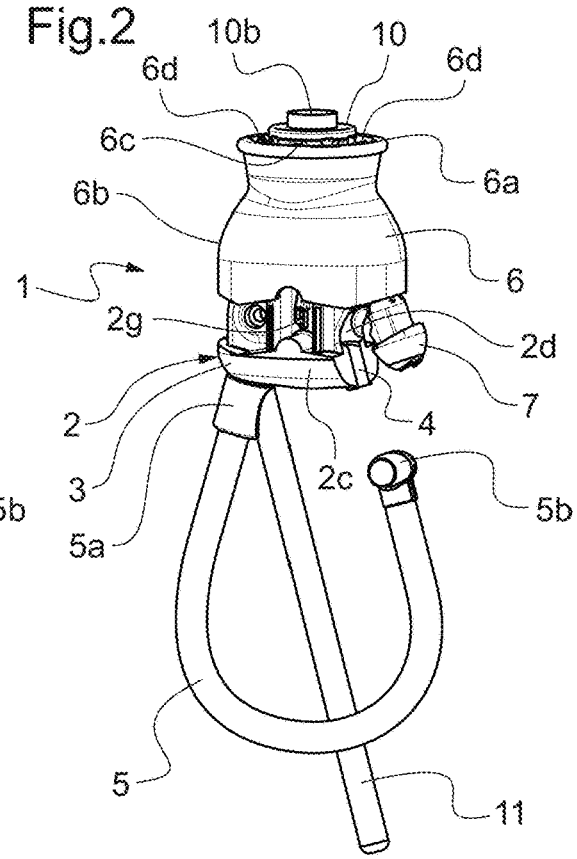
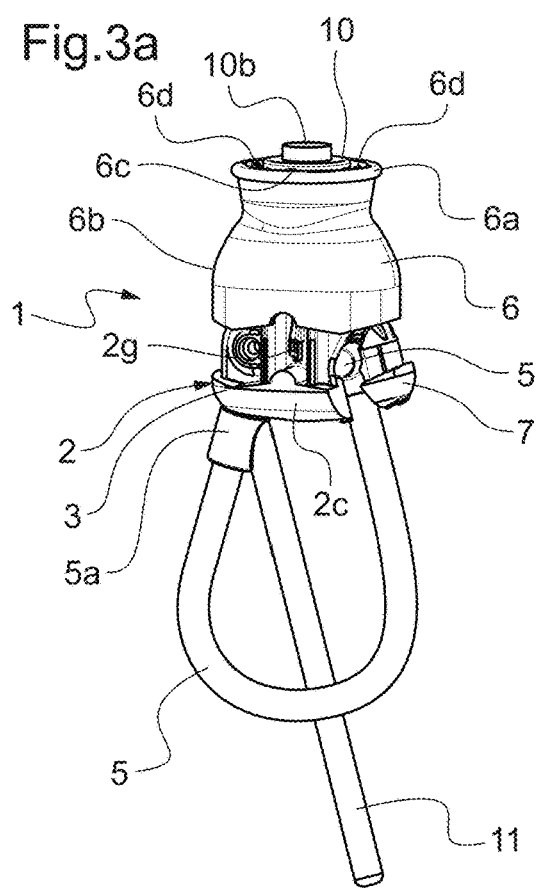
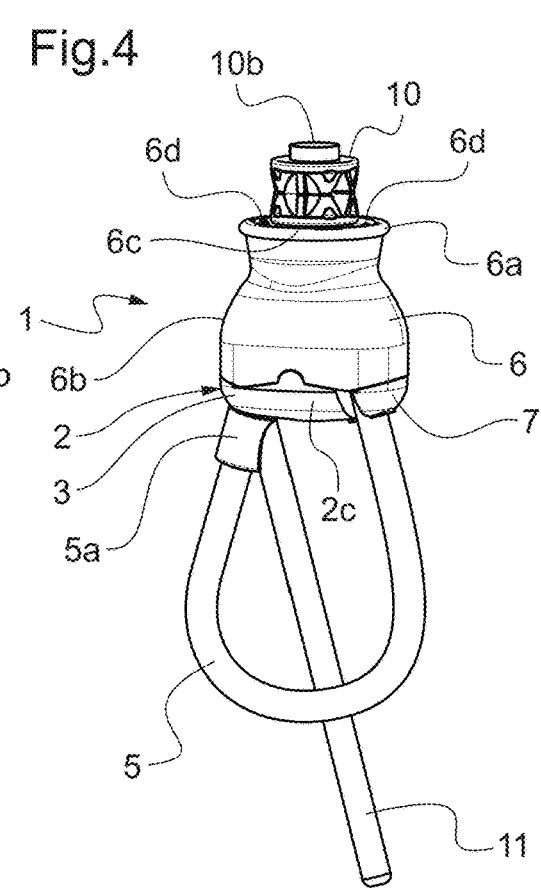

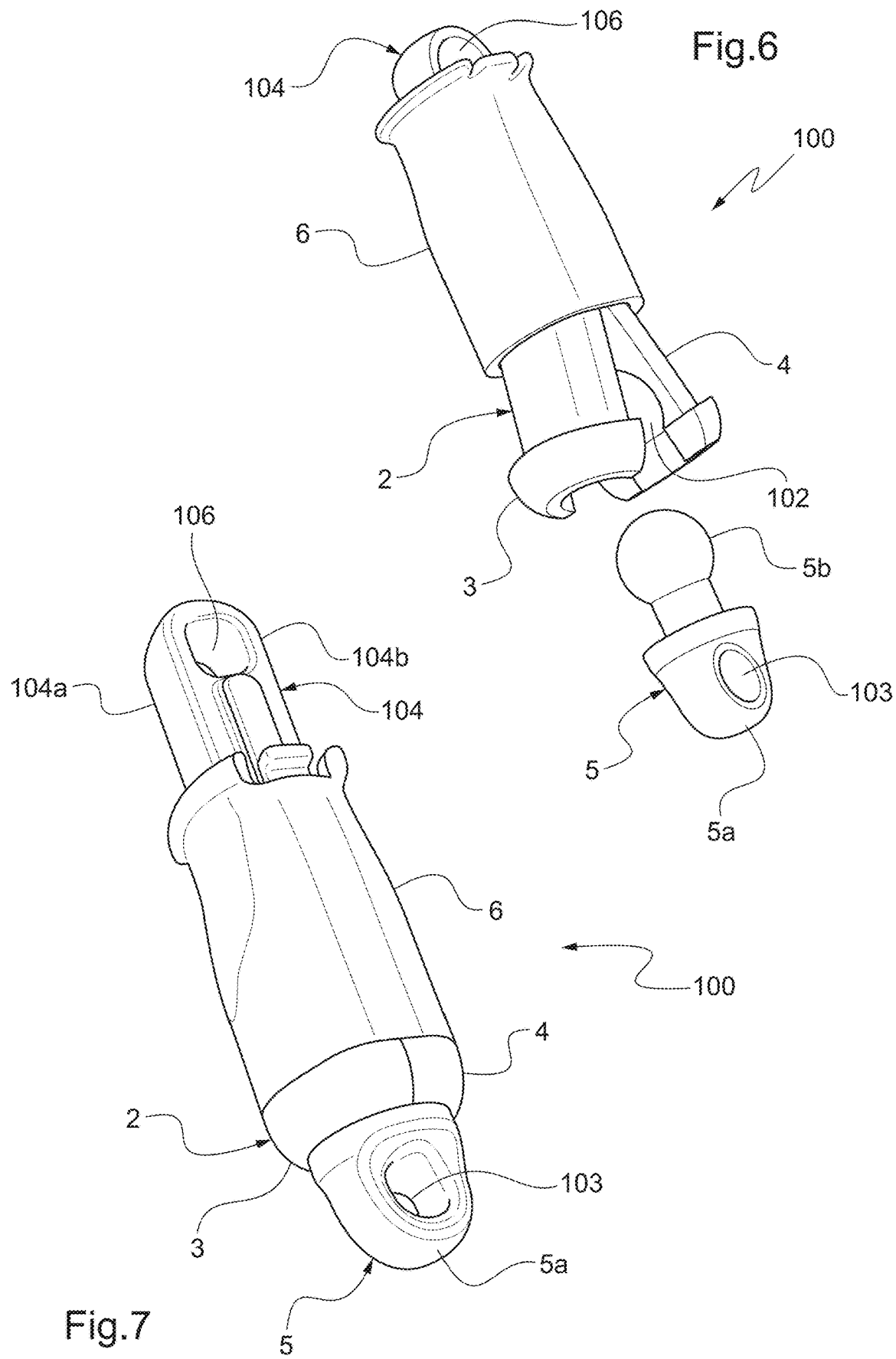

COUPLING SYSTEM, ASSEMBLY OF AN EQUIPMENT RIGIDLY CONNECTED TO A USER AND A COUPLING SYSTEM AND KITEBOARDING KITE BAR

BACKGROUND OF THE INVENTION

Field of the Invention

The present invention relates to the sports field of kiteboards, and more generally the nautical field, and in particular relates to a coupling system for coupling a piece of equipment rigidly connected to a user to at least one rigging strand connected, for example, to a kiteboarding kite, to an assembly of an equipment rigidly connected to a user and a coupling system, and to a kiteboarding kite bar.

Kiteboarding is a gliding sport consisting in moving with a board on the surface of a body of water while being pulled by a specially designed kite, called kite or sail. The kiteboarder, coupled to the kite by a harness, steers the kiteboard using a bar to which the traction lines of the kite are connected.

A release system on which the harness is fastened makes it possible, in case of emergency, to cancel the power of the kite by releasing the harness when the kiteboarder actuates said release system by detaching the loop from the chicken loop of the harness.

Description of the Related Art

The existing release systems, like those described in German patent application DE102009029987A1 and in German utility model application DE202011050424 U1, typically comprise a single-piece type central body on which a first end of a loop is attached, also called "chicken loop"; a plunger that makes it possible to separate the second end of the loop; the loop having, at its first end, a ring or two strands and, at its second end, a hook, a ring or a protuberance that is released when the user pushes the plunger upward; and optionally a line straightener arranged on the upper part of the central body.

However, the single-piece type central body of the existing release systems is a very complex part that is expensive to manufacture, since it requires creating a very costly mold with drawers for stripping the central body.

Furthermore, the central body of the existing release systems has a fairly significant height, especially when it is topped by a line straightener. As a result, there is a great distance between the kiteboarder and the kiteboarding kite bar, due to the release system that is inserted between the two. Yet the shorter the release system is, the more the kiteboarder will be able to depower the sail and therefore quickly and easily reduce the power of the kiteboard. Thus, currently, and above all when the kiteboarders use a belt-type harness, they cannot easily depower the sail, the kiteboarder having, as a reminder, to push the bar far away from him to depower the kiteboard and reduce its power. Furthermore, the short people who use a belt-type harness are often at arms' length when the kiteboard retains power, the height of the release system then limiting their ability to depower.

A kiteboarding kite bar with four rigging lines comprises two front lines and two rear lines, the two front lines being connected to the leading edge and retaining nearly 90% of the power of the kiteboard, the power on the rear lines being much weaker.

The central body of the existing release systems generally comprises a central hole that is often too narrow, and makes it difficult to pass the safety line, and in particular the junction between the safety line and the kite line, if the assembly was designed on the front line. Thus, many manufacturers avoid passing the safety line inside the central body, which leads to not completely depowering the sail in case of emergency release and may prove highly problematic in terms of safety.

In the case of a single-piece type central body, the line straightener is superimposed on the single-piece type central body, and thus in the case where the rope (also called the "depower rope") comprises two strands, the latter come out separated, and the total height of the release system is greater.

SUMMARY OF THE INVENTION

The present invention seeks to resolve the drawbacks of the state of the art by proposing a coupling system for coupling a piece of equipment rigidly connected to a user with at least one rigging strand comprising a central body made up of two parts configured to be assembled with one another via an attachment means, which allows natural stripping of the central body and therefore reduces manufacturing cost of the central body mold, which no longer needs drawers.

The invention also proposes an assembly of an equipment rigidly connected to a user and a coupling system, and a kiteboarding kite bar comprising the coupling system according to the invention making it possible to release the kiteboarding kite in case of emergency.

The present invention therefore relates to a coupling system for coupling a piece of equipment rigidly connected to a user to at least one rigging strand, characterized in that it comprises a central body made up of two parts configured to be assembled with one another via an attachment means, the central body having an end on the rigging strand side configured for the connection to the at least one rigging strand and an opposite end on the user side; a fastener comprising two ends, namely a first end and a second end, said fastener being configured to attach releasably to the piece of equipment rigidly connected to the user; a shell configured to at least partially cover the side surface of the central body; and at least one fastener second end blocking means configured to cooperate with the shell to releasably block the second end of the fastener at the user side end of the central body, the shell being translatable on the side surface of the central body and being connected to the central body via at least one elastic recall means, such that, in a position urged away from the elastic recall means in which the shell does not cover the at least one blocking means, the second end of the fastener is configured to be inserted in/removed from the at least one blocking means and, in a position urged alongside the elastic recall means in which the shell covers the at least one blocking means and when the second end of the fastener is arranged in the at least one blocking means, the at least one blocking means is configured to block the second end of the fastener in the coupling system.

According to a first embodiment of the invention, the first end of the fastener is configured to be blocked fixedly between the two assembled parts of the central body at the user side end of the central body. The fastener thus corresponds to a chicken loop of traditional width.

Rigging refers to a rope or cable made up of one or several strands, each strand being made from plant fibers, synthetic fibers and/or metal.

In the position urged away, the shell is separated from the central body, while in the position urged alongside, the shell is alongside on the central body, but urged to stay in said position.

A rigging with one or two strands, for example connected to a kiteboard kite, is attached to the central body of the coupling system.

The piece of equipment rigidly connected to the user may be harness worn by the user, such as a belt harness, which can be attached on the closed fastener of the coupling system. When the user pushes the shell in the direction opposite the closed fastener, the fastener is released automatically, which allows the fastener (chicken loop) to separate from the harness and release the kiteboard kite in case of emergency.

Thus, designing the central body in two parts allows natural stripping of the body, and therefore reduces the manufacturing cost of the mold, which does not require drawers.

In the case of a kiteboard kite, the mounting of the "depower rope", i.e., the rope that connects the coupling system to the two front lines, on the central body of the coupling system, is very fast, and the coupling system can be mounted once the entire kiteboarding bar has already been assembled, unlike the other release systems, which must be mounted at the same time as the kiteboarding bar.

It is useful to be able to assemble and disassemble the coupling system easily and quickly to perform maintenance and for example to replace the fastener, in order to increase or decrease its size, for example:

professional freestylers, who often detach the fastener from the harness to perform tricks, appreciate a larger fastener to be able to reattach it to the harness easily;

short people, who therefore have shorter arms, will appreciate having the shortest possible fastener, to depower the kite more quickly;

speed competitors also wish to have a very short fastener, to "board deeply" (in other words, to have the maximum power as close as possible to them) or indeed to depower the kite more quickly; and kiteboarders who are navigating waves will appreciate as short a coupling system as possible, to be able to depower the kite if the combination of the action of the wave and the wind has created an overpower effect affecting the kite.

The coupling system may thus comprise several blocking means, to facilitate the coupling of the fastener second end, while leaving more possibilities for the user to do so.

According to a second embodiment of the invention, the first end of the fastener is configured to be attached to the piece of equipment rigidly connected to the user.

In the case of a harness, the fastener first end can be connected directly to the harness by a cord or on the metal harness loop, optionally with a rotation means.

Thus, the distance between the kiteboarding bar and the user is further reduced, and 360° mobility of the user is provided.

In this second embodiment, the shape of the fastener second end is preferably spherical in order to allow a 360° rotation of the central body around the second spherical fastener end.

According to one particular feature of the invention, the two parts of the central body are symmetrical and configured to be assembled at their plane of symmetry.

The rigging strand side and user side ends of the central body are preferably both contained in the plane of symmetry of the two parts of the central body.

According to one particular feature of the invention, the attachment means is at least one nut-screw assembly, the screw being configured to be inserted into opposite holes formed in the two parts of the central body.

It should be noted that the at least one nut-screw assembly could also be replaced by another attachment system, such as rivets, for example. However, in the case of rivets, it will not be easy to disassemble the attachment system for maintenance thereof.

The attachment means preferably comprises two nut-screw assemblies.

The two nut-screw assemblies used to screw the two parts of the central body make it possible to grip the first end of the fastener very quickly and securely.

It should be noted that one of the screws of the two nut-screw assemblies could also be inserted into a hole formed in the first end of the fastener in order to improve the attachment of the first end of the fastener in the central body of the coupling system, without deviating from the scope of the present invention.

The nut-screw assemblies are made from stainless steel and provide holding solidity of the central body and the fastener.

The assembly time of the attachment system is very quick; it suffices to position the fastener first end between the two parts of the central body, screw the nuts on the screws, then add the shell serving as plunger on the surface of the central body and position the elastic recall means. The mounting time is around just several minutes, unlike the existing release systems. The saved time is therefore reflected by savings in terms of labor costs.

According to one particular feature of the invention, each blocking means is a jaw connected to the central body via a rotation axis arranged on the central body, the jaw preferably being an extension of the side surface of the central body in the position urged alongside the elastic recall means.

Thus, the jaw makes it possible to block the second end of the fastener against the side surface of the central body, the rotation axis to which the jaw is connected allowing the rotation of the jaw in order to allow it to open/close.

In the position urged away from the elastic recall means, the shell does not cover the jaw, such that the jaw can open in order to insert the second end of the fastener between the side surface of the central body and the jaw.

In the position urged alongside the elastic recall means, the shell covers the jaw, such that the jaw closes and blocks the second end of the fastener against the central body.

According to one particular feature of the invention, the rotation axis of the jaw is the screw of the at least one nut-screw assembly.

Thus, assembling the two parts of the central body also makes it possible to assemble the jaw of the coupling system on the central body, the end of the jaw receiving the screw as rotation axis being arranged between the two assembled parts of the central body.

According to one particular feature of the invention, the second end of the fastener has a shape complementary to the jaw and configured to be blocked by the jaw against the central body in the position urged alongside the elastic recall means.

The side surface of the central body opposite the jaw may also have a recess having a shape complementary to the second end of the fastener in order to allow better blocking of the fastener second end in the coupling system.

It should be noted that the coupling system could also not comprise a jaw, the at least one blocking means being only the cooperation of the recess in the side surface of the central body and the internal surface of the shell, without deviating from the scope of the present invention.

According to a first variant of the invention, the elastic recall means is at least one rubber band, one end of which is connected to the shell and the other end of which is connected to the central body.

Thus, the return force of the at least one rubber band allows the shell to return to its original position when the user no longer pushes the shell toward the at least one rigging strand and thus the blocking of the fastener second end in the coupling system. The user-side end of the central body preferably comprises a stop against which the user-side end of the shell bears in the position urged alongside the at least one rubber band.

According to a second variant of the invention, the elastic recall means is at least one tension spring, one end of which is connected to the shell and the other end of which is connected to the central body.

According to one particular feature of the invention, the jaw comprises a jaw elastic recall means.

Thus, the jaw elastic recall means makes it possible to open the jaw in its position urged away, and to close the jaw in its position urged alongside. Preferably, the position urged away of the jaw elastic recall means occurs during the position urged away of the shell elastic recall means, such that the jaw opens when the user pushes the shell toward the kite of the kiteboard.

According to one particular feature of the invention, the at least one rubber band is also used as jaw elastic recall means by being connected, between its two ends, to the jaw.

Thus, the at least one rubber band makes up both the shell elastic recall means and the jaw elastic recall means. The urging of the rubber band when the user pushes the shell toward the at least one rigging strand also causing the opening of the jaw in order to facilitate the insertion of the second end of the fastener between the jaw and the central body.

According to one particular feature of the invention, the coupling system further comprises a line straightener, the lower part of which is mounted loose in the central hole of the central body between the two assembled parts at the rigging strand side end of the central body, the line straightener comprising a central hole able to receive at least one rigging strand, the lower part of the line straightener being configured to receive, wound around the latter, the at least one rigging strand.

Thus, the line straightener is mounted loose in a recess formed in the central body, the rotation of the line straightener around itself making it possible to straighten the twisted rigging strands easily. Furthermore, the line straightener can easily be mounted between the two parts of the central body, by arranging the line straightener between the two unassembled parts at the rigging strand side end of the central body, then assembling said two parts to one another using the attachment means.

When two rigging strands are inserted into the central hole of the line straightener, said two strands exit the line straightener side by side toward the kiteboard kite.

When the coupling system has a line straightener, the lower part thereof is integrated inside the two assembled parts of the central body, which makes it possible to save a tremendous amount of space heightwise, and therefore to depower the kiteboard more easily. Furthermore, the travel lost to trigger the release with the shell serving as plunger is used wisely to place the line straightener therein, whereas in the case of a central body of the existing single-piece type, it would be necessary to place the line straightener above the single-piece type central body. As an example, the existing coupling systems are generally 12 cm or more high, while the coupling system according to the present invention is preferably 9 cm high.

In the case of the coupling system equipped with a line straightener and a two-part central body, it is possible to have the two strands of the "power rope" emerge through the central hole, and therefore to be able to sheathe the riggings at once that pass through the center of the bar, whereas if the line straightener is placed above the central body of the coupling system and the central body is in one piece, the rigging that connects the coupling system to the kite cannot pass through the center of the coupling system and the riggings will be separated, which will make sheathing difficult, each strand in this case having to be sheathed separately.

According to one particular feature of the invention, the central hole of the line straightener is covered by a foam comprising an orifice in which the at least one rigging strand can be inserted.

The foam, preferably of the EPDM (ethylene-propylene-diene monomer) rubber or silicone type, makes it possible to absorb the impacts between the kiteboarding bar and the upper part of the line straightener. Said foam can assume the form of a flat pellet, or a pellet with a shoulder that forms a cap.

According to one particular feature of the invention, the central body comprises a central through hole in which at least one rigging strand can be inserted.

Thus, it is possible to conceive a central hole larger than those of the existing coupling systems, which may also accommodate the "depower rope", and allow an easier passage of the safety line. The passage of the safety line in the central through hole of the central body makes it possible to prevent the safety line from wrapping around the coupling system in the case where the kiteboarder performs a rotation with the kiteboarding kite.

It should be noted that the central body could also comprise no central through hole, the safety line then being attached to the outside of the central body, without deviating from the scope of the present invention.

According to another embodiment of the invention, the at least one blocking means is made up of the two parts of the central body that are symmetrical and connected to one another by a rotation axis at the rigging strand side end of the central body, said rotation axis being the at least one nut-screw assembly, the second end of the fastener having a shape, preferably spherical, complementary to a recess formed in the central body and configured to be blocked between the two parts of the central body in the position urged alongside the elastic recall means.

Thus, in the position urged away from the elastic recall means, the shell does not cover both parts of the central body, such that the two parts of the central body can open in order to insert the second end of the fastener between the two parts of the central body.

In the position urged alongside the elastic recall means, the shell covers both parts of the central body, such that the central body closes and blocks the second end of the fastener therein.

This coupling system according to this other embodiment has smaller dimensions and may, for example, be used to connect the user to a leash of a wakeboard or wakeboard kite.

According to another particular feature of the invention, the rigging strand side end of the central body is connected to the at least one rigging strand via an intermediate connecting part connected to the two parts of the central body via the rotation axis.

According to one particular feature of the invention, the central body, the at least one blocking means and the shell are made from plastic, preferably polyamide filled with fibers at 30% or polycarbonate, or metal, preferably aluminum alloy.

However, the coupling system will preferably be made from plastic to satisfy a weight criterion.

According to one particular feature of the invention, the coupling system further comprises a safety finger arranged at the user side end of the central body.

The safety finger can be attached at the first end of the fastener when said first end of the fastener is blocked fixedly between the two assembled parts of the central body.

The safety finger can also be screwed on one of the two parts of the central body, preferably in a recess formed in the user side end of the central body.

Thus, the safety finger, or "tchoutch" or "blocking finger", makes it possible to prevent, when the rigging lines relax and the kiteboarding kite is no longer tensed, the fastener of the coupling system from falling from the fastener of the harness, which would place the kiteboarder in difficulty when the force of the wind picks up again in the kiteboarding kite, the safety finger having to be arranged between the user and the fastener.

According to one particular feature of the invention, the fastener is made up of a rope or a cable covered with a tube of the polyvinyl chloride (PVC), polyurethane or thermoplastic polyurethane (TPU) type.

According to one particular feature of the invention, the coupling system further comprises an attachment ring for a kiteboarding kite leash such as a kiteboarding kite safety rope or leash.

The present invention further relates to an assembly of an equipment rigidly connected to a user and a coupling system comprising a piece of equipment rigidly connected to a user and a coupling system as described above.

According to one particular feature of the invention, the equipment rigidly connected to the user is at least one from among a harness, a shoulder safety belt, a safety belt and a fastening band to a wrist or ankle, for example of the loop and hook type.

According to one particular feature of the invention, the coupling system is connected to at least one rigging strand in turn connected to a kiteboarding kite, a kiteboarding kite bar, a kiteboarding board, a center boarder trapeze, a boat safety deck line, a surfboard, a surfboard kite or a standup paddle board.

The present invention also relates to a kiteboarding kite bar comprising a coupling system as described above.

The kiteboarding kite bar is connected to the kiteboarding kite via riggings including the "depower rope", which is connected to the coupling system, a harness worn by the user such as a belt harness able to be attached on the closed fastener of the coupling system.

BRIEF DESCRIPTION OF THE DRAWINGS

To better illustrate the subject matter of the present invention, below we will describe, as an illustration and non-limitingly, two preferred embodiments, in reference to the appended drawings.

In these drawings:

FIG. 1 is a perspective view of a coupling system according to a first embodiment of the present invention in the position urged alongside the elastic recall means when the fastener of the coupling system is released;

FIG. 2 is a perspective view of the coupling system of FIG. 1 in the position urged away from the elastic recall means when the fastener of the coupling system is released;

FIG. 3a is a perspective view of the coupling system of FIG. 1 in the position urged away from the elastic recall means when the fastener of the coupling system is held;

FIG. 4 is a perspective view of the coupling system of FIG. 1 in the position urged alongside the elastic recall means when the fastener of the coupling system is held;

FIG. 6 is a perspective view of a coupling system according to a second embodiment of the present invention in the position urged away from the elastic recall means when the fastener of the coupling system is released;

FIG. 7 is a perspective view of the system of FIG. 6 in the position urged alongside the elastic recall means when the fastener of the coupling system is held.

DESCRIPTION OF THE PREFERRED EMBODIMENTS

Figure 3B:
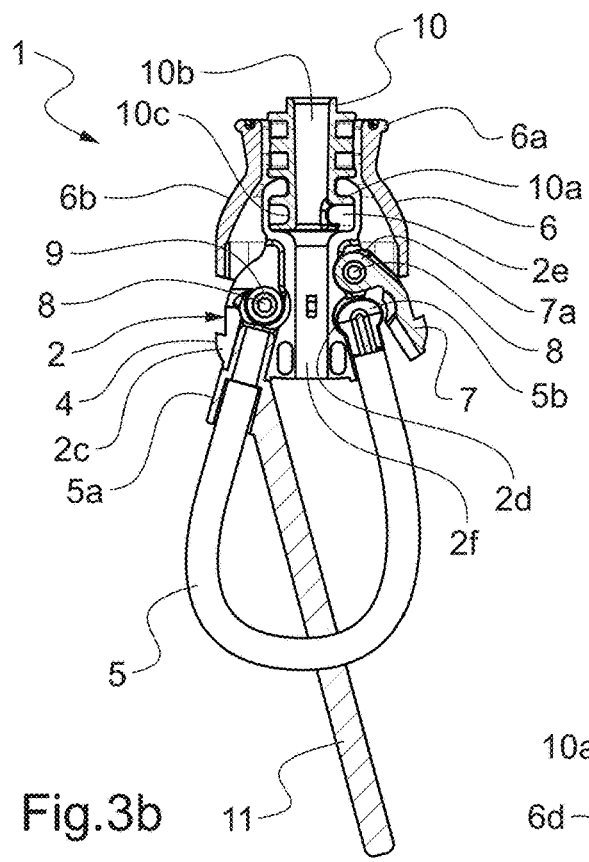
FIG. 3b is a vertical sectional view of FIG. 3a along the plane of symmetry of the two parts of the central body of the coupling system.
Figure 5:
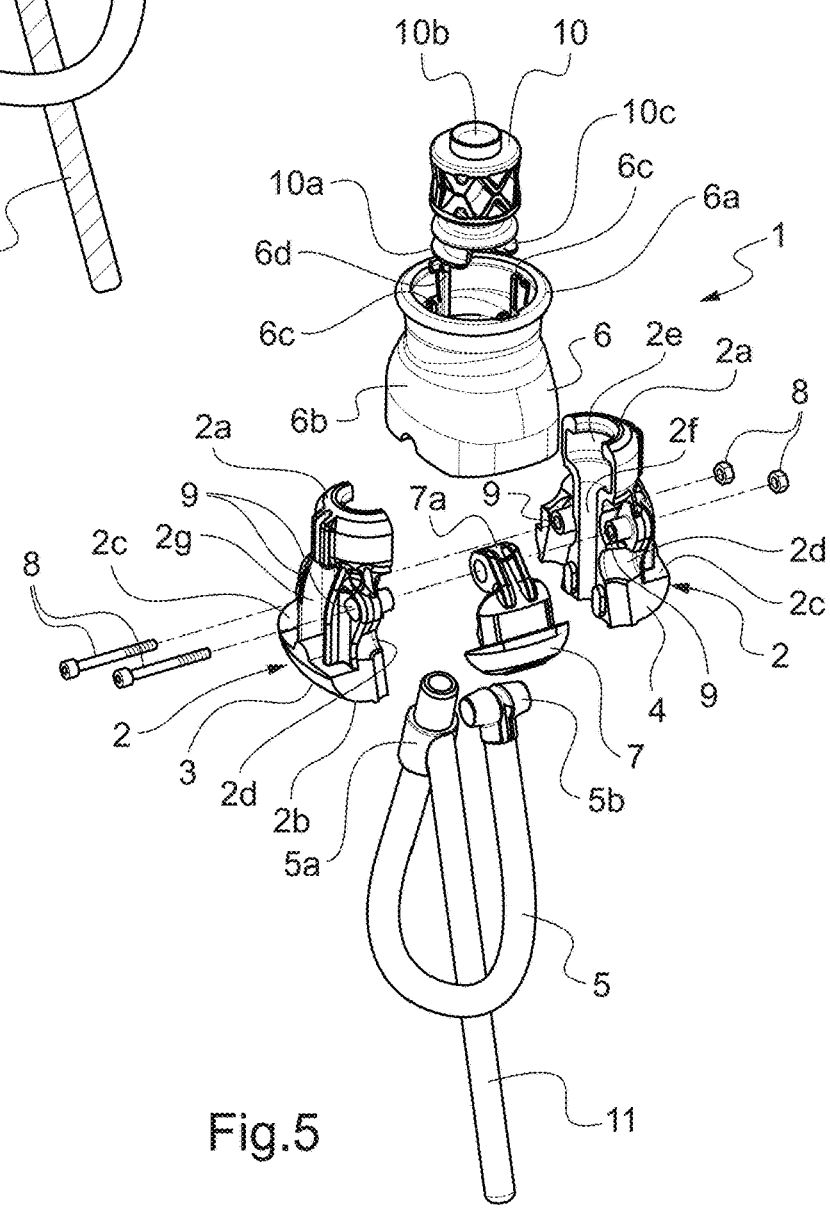
FIG. 5 is an exploded view of the coupling system of FIG. 1.

FIGS. 1, 2, 3a, 3b, 4 and 5 show a coupling system 1 according to a first embodiment of the present invention.

The coupling system 1 for coupling a piece of equipment rigidly connected to a user, such as a harness, to at least one rigging strand, for example connected to a kiteboarding kite, comprises a central body 2 made up of two parts 3 and 4 configured to be assembled to one another by an attachment means that will be described in more detail hereinafter, the central body 2 having a rigging strand side end 2a and an opposite user side end 2b.

Designing the central body 2 in two parts 3 and 4 allows natural stripping of the central body 2 during its design, and therefore reduces the manufacturing cost of the corresponding mold, which no longer needs to have drawers.

The coupling system 1 further comprises a fastener 5 comprising two ends 5a and 5b. The fastener 5 is made up of a rope or cable covered with a tube of the polyvinyl chloride (PVC), polyurethane, or thermoplastic polyurethane (TPU) type. One of the two ends of the tube of the fastener 5 is fixed in the first fastener end 5a, which is in the form of a hollow cylinder. The second fastener end 5b is in the shape of a T, the crosspiece of the T being in the shape of a barrel and the shaft of the T forming a pilot point configured to be fixed in the other of the two ends of the tube of the fastener 5 in order to attach the fastener 5 to the second fastener end 5b.

The first fastener end 5a is configured to be retained/blocked fixedly between the two parts 3 and 4 assembled at the user side end 2b of the central body 2.

It should be noted that the first fastener end 5a could also be configured to be fastened directly to a user harness, without deviating from the scope of the present invention.

The coupling system 1 further comprises a shell or sheath 6 configured to cover, at least partially, the side surface of the central body 2.

The shell 6 has a generally bi-frustoconical shape, flaring from a part of smaller diameter in two opposite directions, by a shorter distance toward the upper part and a larger distance toward the lower part, and comprises, in the upper part, a neck with a wide rim 6a, and in the lower part, a shoulder 6b.

The central body 2 comprises, in the lower part at its user side end 2b, a stop 2c in the form of a peripheral rim turned toward the shell side 6, against which stop 2c the lower part of the shoulder 6b of the shell 6 is configured to abut when the shell 6b covers the side surface of the central body 2.

The coupling system 1 further comprises a blocking means 7 for blocking the second fastener end 5b on the central body 2 configured to cooperate with the shell 6 in order to releasably block the second end 5b of the fastener 5 at the user side end 2b of the central body 2.

The shell 6 is movable in translation like a sheath on the side surface of the central body 2 and is connected to the central body 2 via at least one elastic recall means that will be described in more detail hereinafter, such that, in a position urged away from the elastic recall means in which the shell 6 does not cover the blocking means 7 while being moved away from the central body 2, the second end 5b of the fastener 5 is configured to be inserted in/removed from the blocking means 7 and, in a position urged alongside the elastic recall means in which the shell 6 covers the blocking means 7 and when the second end 5b of the fastener 5 is arranged in the blocking means 7, the blocking means 7 is configured to block the second end 5b of the fastener 5 in the coupling system 1.

The two parts 3 and 4 of the central body 2 are symmetrical and configured to be assembled at their plane of symmetry.

The attachment means of the two parts 3 and 4 of the central body 2 is made up of two nut-screw assemblies 8, each screw being configured to be inserted into opposite holes 9 formed in the two parts 3 and 4 of the central body 2.

The two nut-screw assemblies 8 used to attach the two parts 3 and 4 of the central body 2 to each other make it possible to grip the first end 5a of the fastener 5 very quickly and securely.

The first end 5a of the fastener 5 could also bear a ring, such as a ring-shaped rope, said ring allowing the passage of one of the screws through it, in order to improve the fastening of the first end 5a of the fastener 5 on the central body 2. The first end 5a of the fastener 5 could also bear two rope strands able to be coupled to one another around one of the screws.

It should be noted that the attachment means could also be made up of any number of nut-screw assemblies 8, without deviating from the scope of the present invention.

The nut-screw assemblies 8 could also be replaced by another attachment system, for example rivets. However, in the case of rivets, it will not be easy to disassemble the coupling system 1 for maintenance thereof.

The nut-screw assemblies 8 are preferably made from stainless steel and provide solidity in maintaining the central body 2 and the fastener 5.

The assembly time of the coupling system 1 is thus very fast; it suffices to position the first fastener 5 end 5a between the two parts 3 and 4 of the central body 2, screw the nuts on the screws of the nut-screw assemblies 8, then add the shell 6 serving as plunger on the surface of the central body 2 and position the elastic recall means. The assembly time is around just several minutes, unlike the existing release systems. The time savings is therefore reflected by savings in terms of labor costs.

A harness (not shown in the Figures) worn by the user, such as a belt harness, can thus be attached on the fastener 5 held by the coupling system 1. When the user pushes the shell 6 in the direction opposite the retaining fastener 5, the fastener 5 is released automatically, which makes it possible to free the harness and release the kiteboarding kite in case of emergency.

The blocking means 7 is a jaw connected to the central body 2 via a rotation axis arranged on the central body 2, the jaw 7 being an extension of the side surface of the central body 2 in the position urged alongside the elastic recall means, such that in the position in which the shell 6 covers the central body 2 and the jaw 7, the internal wall of shell follows the shape of the outer wall of the assembly of the central body 2 and the folded jaw 7.

The rotation axis of the jaw 7 is the screw of one of the two nut-screw assemblies 8.

Assembling the two parts 3 and 4 of the central body 2 also makes it possible to assemble the jaw 7 of the coupling system 1 on the central body 2, the end 7a of the jaw 7 receiving the screw as rotation axis being arranged between the two assembled parts 3 and 4 of the central body 2.

The jaw 7 makes it possible to block the second end 5b of the fastener 5 against the side surface of the central body 2, the rotation axis to which the jaw 7 is connected allowing the rotation of the jaw 7 in order to allow it to open/close.

In the position urged away from the elastic recall means, as shown in FIGS. 2, 3a and 3b, the shell 6 does not cover the upper part of the jaw 7, such that the jaw 7 can open in order to insert the second end 5b of the fastener 5 between the side surface of the central body 2 and the jaw 7.

In the position urged alongside the elastic recall means, as shown in FIGS. 1 and 4, the shell 6 covers the upper part of the jaw 7, such that the jaw 7 closes and blocks the second end 5b of the fastener 5 against the central body 2.

The internal face of the jaw 7 has a shape complementary to the barrel shape of the second end 5b of the fastener 5.

The side surface of the central body 2 opposite the jaw 7 has a recess 2d having a shape complementary to the barrel shape of the crosspiece of the T that forms the second end 5b of the fastener 5 in order to allow better blocking of the second fastener end 5b in the coupling system 1.

It should be noted that the coupling system 1 could also not comprise a jaw 7, the blocking means being only the cooperation of the recess 2d in the side surface of the central body 2 and the internal surface of the shell 6, without deviating from the scope of the present invention.

The elastic recall means is at least one rubber band (not shown in the Figures in order not to overload the drawings), one end of which is connected to the internal wall of the shell 6 and the other end of which is connected to the central body 2.

The internal face of the neck with a wide edge 6a of the shell 6 comprises two opposite protrusions 6c, and the side surface of the central body 2 also comprises two opposite protrusions 2g, the four protrusions 6c and 2g being arranged in a same vertical plane. Thus, two rubber bands can be arranged between the internal face of the shell 6 and the side surface of the central body 2, one end of each rubber band being inserted into a notch formed in a protrusion 6c of the shell 6 and the other rubber band end being inserted into a notch formed in a protrusion 2g of the central body 2.

The internal face of the shell 6 also comprises two opposite vertical tongues 6d configured to allow the guiding of the translation of the shell 6 on the side surface of the central body 2.

The return force of the at least one rubber band allows the return of the shell 6 into its original position abutting against the stop 2c of the central body 2 when the user no longer pushes the shell 6 toward the kiteboarding kite and thus the blocking of the second fastener end 5b in the coupling system 1.

It should be noted that the elastic recall means could also be at least one tension spring, one end of which is connected to the shell 6 and the other end of which is connected to the central body 2, without deviating from the scope of the present invention.

The jaw 7 could also comprise a jaw elastic recall means, without deviating from the scope of the present invention. The jaw elastic recall means would then make it possible to open the jaw 7 in its position urged away, and to close the jaw 7 in its position urged alongside. Preferably, the position urged away from the jaw elastic recall means would occur during the position urged away from the shell elastic recall means, such that the jaw 7 would open when the user pushes the shell 6 toward the kiteboarding kite.

In the case where the jaw 7 comprises a jaw elastic recall means, the at least one rubber band serving as return means of the shell 6 could also serve as jaw elastic recall means by being connected, between its two ends, to the jaw 7. Thus, in this case, the at least one rubber band makes up both the elastic recall means of the shell 6 and the elastic recall means of the jaw 7. The urging of the rubber band when the user pushes the shell 6 toward the kiteboarding kite also causes the opening of the jaw 7 in order to facilitate the insertion of the second end 5b of the fastener 5 between the jaw 7 and the central body 2.

In FIG. 1, the coupling system 1 is shown in the position urged alongside the elastic recall means when the fastener 5 of the coupling system 1 is released.

In FIG. 2, the coupling system 1 is shown in the position urged away from the elastic recall means when the fastener 5 of the coupling system 1 is released. To that end, the user must push the shell 6 toward the kiteboarding kite, away from the central body 2.

In FIGS. 3a and 3b, the coupling system 1 is shown in the position urged away from the elastic recall means when the fastener 5 of the coupling system 1 is held. To that end, the user must position the second end 5b of the fastener 5 between the jaw 7 and the central body 2, while keeping the shell 6 in the position urged away from the elastic recall means.

In FIG. 4, the coupling system 1 is shown in the position urged alongside the elastic recall means when the fastener 5 of the coupling system 1 is retained. To that end, the user must release the shell 6 so that the latter covers the upper part of the jaw 7 to block the second end 5b of the fastener 5 in position, the user then being able to attach a harness on the held fastener 5 of the coupling system 1. In case of emergency, the user must be able to push the shell 6 toward the kiteboarding kite in order to open the fastener 5 to release and free the fastener from the harness and depower the kiteboarding kite.

The coupling system 1 further comprises a line straightener 10, the lower part 10a of which is mounted loose in a recess 2e formed between the two assembled parts 3 and 4 at the rigging strand side end 2a of the central body 2.

The line straightener 10 comprises a central through hole 10b able to receive at least one rigging strand (not shown in the Figures), the lower part 10a of the line straightener 10 being configured to receive, wound around it, the at least one rigging strand.

The lower part 10a of the line straightener 10 comprises a circular groove 10c formed on its side surface and configured to allow the winding of the at least one strand coming from the central hole 10b around the latter.

The rotation of the line straightener 10 around itself allows easy straightening of the twisted rigging strands exiting the line straightener 10. The line straightener 10 can easily be mounted between the two parts 3 and 4 of the central body 2, by arranging the line straightener 10 between the two parts 3 and 4 not assembled at the kite side end 2a of the central body 2, then assembling said two parts 3 and 4 to one another using the two nut-screw assemblies 8.

When a rope is inserted in the central hole 10b of the line straightener 10, then is wound around the lower part 10a of the line straightener 10, the two rope strands then exit side by side from the upper part of the central hole 10b of the line straightener 10 toward the kiteboarding kite.

The lower part 10a of the line straightener 10 being integrated inside the central body 2, this makes it possible to save space heightwise, and therefore to depower the kiteboard more easily.

The upper part of the central hole 10b of the line straightener 10 could also be covered with foam, of the EPDM (ethylene-propylene-diene monomer) rubber or silicone or polyurethane foam type, so as to absorb the impacts between the kiteboarding bar and the upper part of the line straightener 10, said foam comprising an orifice in which the at least one rigging strand can be inserted, said foam being able to assume the form of a flat pellet, or a pellet with a shoulder that forms a cap.

The central body 2 also comprises a central through hole 2f, in communication with the central through hole 10b of the line straightener 10, and in which at least one rigging strand can be inserted such as a kiteboarding leash.

The central body 2, the jaw 7 and the shell 6 are made from plastic, preferably polyamide filled with fibers at 30%, but could also be made from metal, without deviating from the scope of the present invention.

The coupling system 1 further comprises a safety finger 11 attached to the first end 5a of the fastener 5, the safety finger 11 having to be arranged between the user and the fastener 5 during use.

It should be noted that the safety finger 11 could also be attached on one of the two parts 3 and 4 of the central body 2, without deviating from the scope of the present invention.

It should be noted that the coupling system 1 could also comprise an attachment ring for a kiteboarding kite leash such as a kiteboarding kite leash, without deviating from the scope of the present invention.

Figure 8:
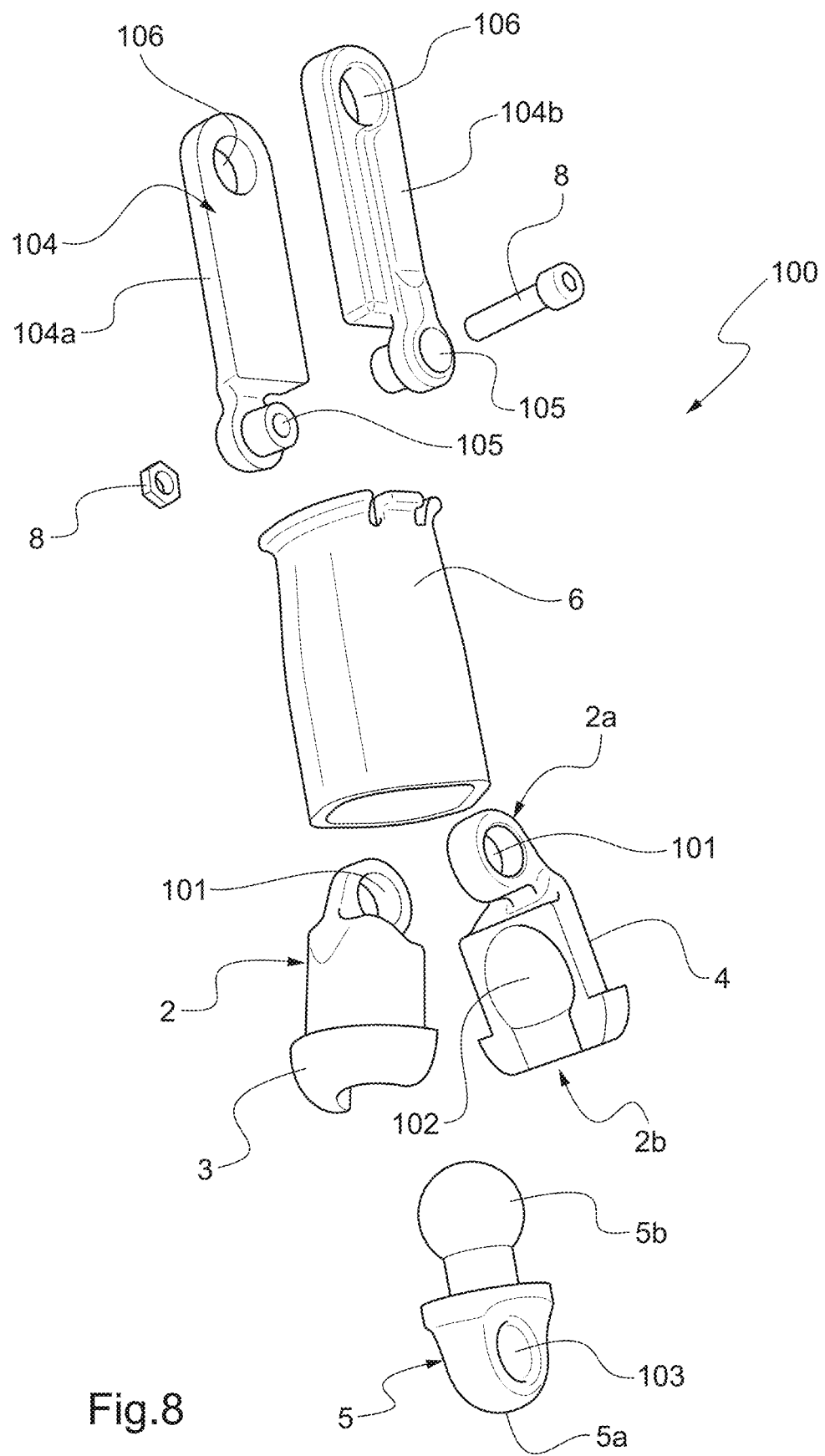
FIG. 8 is an exploded view of the coupling system of FIG. 6.

FIGS. 6, 7 and 8 show a coupling system 100 according to a second embodiment of the present invention.

The elements that are shared between the first embodiment of the invention and this second embodiment of the invention bear the same reference numerals and will not be described in more detail here when they have identical structures.

In this second embodiment of the invention, the fastener second end 5b blocking means is made up of the two parts 3, 4 of the central body 2, which are symmetrical and connected to one another by a rotation axis at the rigging strand side end 2a of the central body 2.

Said rotation axis is formed by a nut-screw assembly 8, the screw of the nut-screw assembly 8 passing through a hole 101 formed in each part 3, 4 of the central body 2 at the rigging strand side end 2a. The two parts 3 and 4 of the central body 2 can thus move away from one another, by rotation around said rotation axis, when the shell 6 is pushed by the user away from the latter.

The second end 5b of the fastener 5 has a spherical shape that is complementary to a recess 102 formed in the central body 2 and that is configured to be blocked between the two parts 3, 4 of the central body 2 in the position urged alongside the elastic recall means.

A hole 103 is formed in the first end 5a of the fastener 5 in order to allow the attachment of the piece of equipment rigidly connected to the user, such as a harness, to the fastener 5 of the coupling system 100.

The rigging strand side end 2a of the central body 2 is connected to at least one rigging strand via an intermediate connecting part 104 connected to the two parts 3, 4 of the central body 2 via the rotation axis.

Said intermediate connecting part 104 is made up of two nestable elements 104a and 104b. The lower part of each element 104a and 104b comprises a hole 105 in which the screw of the nut-screw assembly 8 is inserted in order to allow the attachment of the central body 2 on the intermediate connecting part 104 while allowing its rotation. The upper part of each element 104a and 104b comprises a hole 106 in order to allow the attachment of at least one rigging strand to the intermediate connecting part 104 of the coupling system 100.

As shown in FIG. 6, in the position urged away from the elastic recall means, the shell 6 does not cover both parts 3 and 4 of the central body, such that the two parts 3 and 4 of the central body 2 can open in order to insert the second end 5b of the fastener 5 between the two parts 3 and 4 of the central body 2.

As shown in FIG. 7, in the position urged alongside the elastic recall means, the shell 6 covers the two parts 3 and 4 of the central body 2, such that the central body 2 closes and blocks the second end 5b of the fastener 5 therein.

The invention further relates to an assembly of an equipment rigidly connected to a user and a coupling system comprising a piece of equipment rigidly connected to a user and a coupling system 1 or 100 as described above.

The piece of equipment rigidly connected to the user is at least one from among a harness, a shoulder safety belt, a safety belt and a fastening band to a wrist or ankle, for example of the hook and loop type.

The coupling system 1 or 100 is connected to at least one rigging strand in turn connected to a kiteboarding kite, a kiteboarding kite bar, a kiteboarding board, a center boarder trapeze, a boat safety deck line, a surfboard, a surfboard kite or a standup paddle board.

The invention also relates to a kiteboarding kite bar comprising a coupling device 1 or 100 as described above. The kiteboarding kite bar is connected to the kiteboarding kite via riggings including the "depower rope" that is connected to the coupling system 1 or 100, a harness worn by the user such as a belt harness able to be attached on the fastener 1 retained by the coupling system 1 or 100.

The invention claimed is:

1. A coupling system for coupling a piece of equipment rigidly connected to a user to at least one rigging strand, the coupling system comprising:
   a central body made up of two parts configured to be assembled with one another via an attachment means, the central body having an end on the rigging strand side configured for the connection to the at least one rigging strand and an opposite end on the user side;
   a fastener comprising a first end and a second end, the fastener being configured to be attached releasably to the piece of equipment rigidly connected to the user;
   a shell configured to at least partially cover the side surface of the central body; and
   at least one means for blocking the fastener second end configured to cooperate with the shell to releasably block the second end of the fastener at the user side end of the central body,
the shell being translatable on the side surface of the central body and being connected to the central body via at least one elastic recall means, such that, in a position urged away from the elastic recall means in which the shell does not cover the at least one blocking means, the second end of the fastener is configured to be inserted in/removed from the at least one blocking means and, in a position urged alongside the elastic recall means in which the shell covers the at least one blocking means and when the second end of the fastener is arranged in the at least one blocking means, the at least one blocking means is configured to block the second end of the fastener in the coupling system.

2. The coupling system according to claim 1, wherein the first end of the fastener is configured to be blocked fixedly between the two assembled parts of the central body at the user side end of the central body.

3. The coupling system according to claim 1, wherein the first end of the fastener is configured to be attached to the piece of equipment rigidly connected to the user.

4. The coupling system according to claim 1, wherein the two parts of the central body are symmetrical and configured to be assembled at their plane of symmetry.

5. The coupling system according to claim 1, wherein the attachment means is at least one nut-screw assembly, the screw being configured to be inserted into opposite holes formed in the two parts of the central body.

6. The coupling system according to claim 5, wherein the at least one blocking means is made up of the two parts of the central body are symmetrical and connected to one another by a rotation axis at the rigging strand side end of the central body, the rotation axis being the at least one nut-screw assembly, the second end of the fastener having a shape complementary to a recess formed in the central body and configured to be blocked between the two parts of the central body in the position urged alongside the elastic recall means.

7. The coupling system according to claim 6, wherein the rigging strand side end of the central body is connected to the at least one rigging strand via an intermediate connecting part connected to the two parts of the central body via the rotation axis.

8. The coupling system according to claim 1, wherein each blocking means is a jaw connected to the central body via a rotation axis arranged on the central body.

9. The coupling system according to claim 8, wherein the second end of the fastener has a shape complementary to the jaw and configured to be blocked by the jaw against the central body in the position urged alongside the elastic recall means.

10. The coupling system according to claim 8, wherein the jaw comprises a jaw elastic recall means.

11. The coupling system according to claim 10, wherein the at least one rubber band is also used as jaw elastic recall means by being connected, between its two ends, to the jaw.

12. The coupling system according to claim 1, wherein the elastic recall means is one of:

a rubber band, one end of which is connected to the shell and the other end of which is connected to the central body, and one tension spring, one end of which is connected to the shell and the other end of which is connected to the central body.

13. The coupling system according to claim 1, wherein the coupling system further comprises a line straightener, the lower part of the line straightener is mounted loose in the central hole of the central body between the two assembled parts at the rigging strand side end of the central body, the line straightener comprising a central hole able to receive at least one rigging strand, the lower part of the line straightener being configured to receive, wound around the line straightener, the at least one rigging strand.

14. The coupling system according to claim 13, wherein the central hole of the line straightener is covered by a foam comprising an orifice in which the at least one rigging strand can be inserted.

15. The coupling system according to claim 1, wherein the central body comprises a central through hole in which at least one rigging strand can be inserted.

16. The coupling system according to claim 1, wherein the coupling system further comprises a safety finger arranged at the user side end of the central body.

17. An assembly of an equipment rigidly connected to a user and a coupling system comprising a piece of equipment rigidly connected to a user and a coupling system according to claim 1.

18. The assembly of an equipment rigidly connected to a user and a coupling system according to claim 17, wherein the equipment rigidly connected to the user is at least one from among a harness, a shoulder safety belt, a safety belt and a fastening band to a wrist or ankle.

19. The equipment assembly rigidly connected to a user and a coupling system according to claim 17, wherein the coupling system is connected to at least one rigging strand in turn connected to a kiteboarding kite, a kiteboarding kite bar, a kiteboarding board, a center boarder trapeze, a boat safety deck line, a surfboard, a surfboard kite or a standup paddle board.

* * * * *